US010917951B1

(12) United States Patent
Lee et al.

(10) Patent No.: US 10,917,951 B1
(45) Date of Patent: Feb. 9, 2021

(54) LIGHT SOURCE CALIBRATION AND AGING COMPENSATION SYSTEM

(71) Applicant: B/E Aerospace, Inc., Winston-Salem, NC (US)

(72) Inventors: Simon Robert Lee, Southampton (GB); Graham Nigel Hildyard, Chandlers Ford (GB); Steven Mark Hanley, Corfe Mullen (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/659,273

(22) Filed: Oct. 21, 2019

(51) Int. Cl.
*H05B 45/22* (2020.01)
*H05B 45/40* (2020.01)
*B64D 47/02* (2006.01)

(52) U.S. Cl.
CPC ............ *H05B 45/22* (2020.01); *B64D 47/02* (2013.01); *H05B 45/40* (2020.01); *B64D 2203/00* (2013.01); *B64D 2221/00* (2013.01)

(58) Field of Classification Search
CPC ........ H05B 45/22; H05B 45/40; B64D 47/02; B64D 2203/00; B64D 2221/00
See application file for complete search history.

(56) References Cited

U.S. PATENT DOCUMENTS

| | | | | |
|---|---|---|---|---|
| 2005/0127381 A1* | 6/2005 | Vitta | ........................ | F21K 9/00 257/88 |
| 2007/0091055 A1* | 4/2007 | Sakuda | ................ | G09G 3/3413 345/102 |
| 2008/0103714 A1* | 5/2008 | Aldrich | .................... | G01J 3/462 702/81 |
| 2009/0020684 A1* | 1/2009 | Shih | ........................ | H05B 45/20 250/205 |
| 2014/0035465 A1* | 2/2014 | Raj | ........................ | G09G 3/30 315/151 |
| 2014/0361696 A1* | 12/2014 | Siessegger | ............. | H05B 45/00 315/186 |
| 2017/0079109 A1* | 3/2017 | Matsui | ................... | H05B 45/00 |
| 2017/0223807 A1* | 8/2017 | Recker | ................ | H02J 13/0017 |

* cited by examiner

*Primary Examiner* — Raymond R Chai
(74) *Attorney, Agent, or Firm* — Suiter Swantz pc llo

(57) ABSTRACT

A system for light source calibration and aging compensation is disclosed. In one or more embodiments, the system includes a light source driver, a sensor, and a controller. The light source driver is configured to generate one or more power signals for a plurality of light sources. The sensor is configured to detect an illumination power output by at least one light source of the plurality of light sources. The controller is communicatively coupled to the sensor and the light source driver. The controller is configured to compare the illumination power detected by the sensor to a target illumination power. The controller is further configured to generate one or more control signals to adjust an electrical power output of the light source driver based on the comparison of the illumination power detected by the sensor to the target illumination power.

18 Claims, 3 Drawing Sheets

LIGHT SOURCE CALIBRATION AND AGING COMPENSATION SYSTEM

BACKGROUND

Light-emitting diode (LED)-based light fixtures are currently used in a variety of lighting applications. For example, LED light strips can be used for aircraft cabin lighting and other interior/exterior lighting applications. In lighting systems that include multiple light fixtures (e.g., stacked or daisy chained LED light strips, light tubes, light panels, or the like), the replacement of a light fixture after a period of time may result in color and/or illumination level imbalances between the replaced (new) light fixture and a neighboring (old) light fixture because the light sources (e.g., LEDs) of the new light fixture may run more efficiently (hence brighter) than the light sources of the old light fixture. Consequently, there is a need for lighting system improvements that help prevent or mitigate color and/or illumination level imbalances between neighboring light fixtures.

SUMMARY

A system for light source calibration and aging compensation is disclosed. In one or more embodiments, the system includes a light source driver, a sensor, and a controller. The light source driver is configured to generate one or more power signals for a plurality of light sources. The sensor is configured to detect an illumination power output by at least one light source of the plurality of light sources. The controller is communicatively coupled to the sensor and the light source driver. The controller is configured to compare the illumination power detected by the sensor to a target illumination power. The controller is further configured to generate one or more control signals to adjust an electrical power output of the light source driver based on the comparison of the illumination power detected by the sensor to the target illumination power.

In some embodiments of the system, the controller is configured to generate the one or more control signals based on a difference between the illumination power detected by the sensor and the target illumination power.

In some embodiments of the system, the one or more control signals cause the light source driver to adjust the one or more power signals for the plurality of light sources until the illumination power detected by the sensor is equivalent to the target illumination power or within a predefined acceptable tolerance of the target illumination power.

In some embodiments of the system, the light source driver comprises a direct current (DC) power source, and the one or more control signals cause the DC power source to adjust a current of the one or more power signals generated by the light source driver.

In some embodiments of the system, the light source driver comprises a pulse width modulator (PWM), and the one or more control signals cause the PWM to adjust a duty cycle of the one or more power signals generated by the light source driver.

In some embodiments of the system, the light source driver comprises a red-green-blue (RGB) or red-green-blue-white (RBGW) light-emitting diode (LED) driver, and the one or more control signals cause the RGB or RBGW LED driver to adjust a current and/or a duty cycle of the one or more power signals generated by the light source driver.

In some embodiments of the system, the light source driver, the sensor, and the controller are coupled to or at least partially embedded in a light strip that includes the plurality of light sources.

In some embodiments of the system, the controller is configured to communicate the illumination power detected by the sensor to another controller of another light strip that is coupled to the light strip.

In some embodiments of the system, the controller is configured to receive the target illumination power from another controller of another light strip that is coupled to the light strip.

In some embodiments of the system, the target illumination power is based on a detected illumination power received by the controller from another controller of another light strip that is coupled to the light strip.

A light fixture that includes a system for light source calibration and aging compensation is also disclosed. In one or more embodiments, the light fixture includes a plurality of light sources, a light source driver, a sensor, and a controller. The light source driver is configured to generate one or more power signals for the plurality of light sources. The sensor is configured to detect an illumination power output by at least one light source of the plurality of light sources. The controller is communicatively coupled to the sensor and the light source driver. The controller is configured to compare the illumination power detected by the sensor to a target illumination power. The controller is further configured to generate one or more control signals to adjust an electrical power output of the light source driver based on the comparison of the illumination power detected by the sensor to the target illumination power.

In some embodiments of the light fixture, the controller is configured to generate the one or more control signals based on a difference between the illumination power detected by the sensor and the target illumination power.

In some embodiments of the light fixture, the one or more control signals cause the light source driver to adjust the one or more power signals for the plurality of light sources until the illumination power detected by the sensor is equivalent to the target illumination power or within a predefined acceptable tolerance of the target illumination power.

In some embodiments of the light fixture, the light source driver comprises a direct current (DC) power source, and the one or more control signals cause the DC power source to adjust a current of the one or more power signals generated by the light source driver.

In some embodiments of the light fixture, the light source driver comprises a pulse width modulator (PWM), and the one or more control signals cause the PWM to adjust a duty cycle of the one or more power signals generated by the light source driver.

In some embodiments of the light fixture, the light source driver comprises a red-green-blue (RGB) or red-green-blue-white (RBGW) light-emitting diode (LED) driver, and the one or more control signals cause the RGB or RBGW LED driver to adjust a current and/or a duty cycle of the one or more power signals generated by the light source driver.

In some embodiments of the light fixture, the light fixture comprises a light strip that includes the plurality of light sources, and the light source driver, the sensor, and the controller are coupled to or at least partially embedded in the light strip.

In some embodiments of the light fixture, the controller is configured to communicate the illumination power detected by the sensor to another controller of another light fixture that is coupled to the light fixture.

In some embodiments of the light fixture, the controller is configured to receive the target illumination power from another controller of another light fixture that is coupled to the light fixture.

In some embodiments of the light fixture, the target illumination power is based on a detected illumination power received by the controller from another controller of another light fixture that is coupled to the light fixture.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
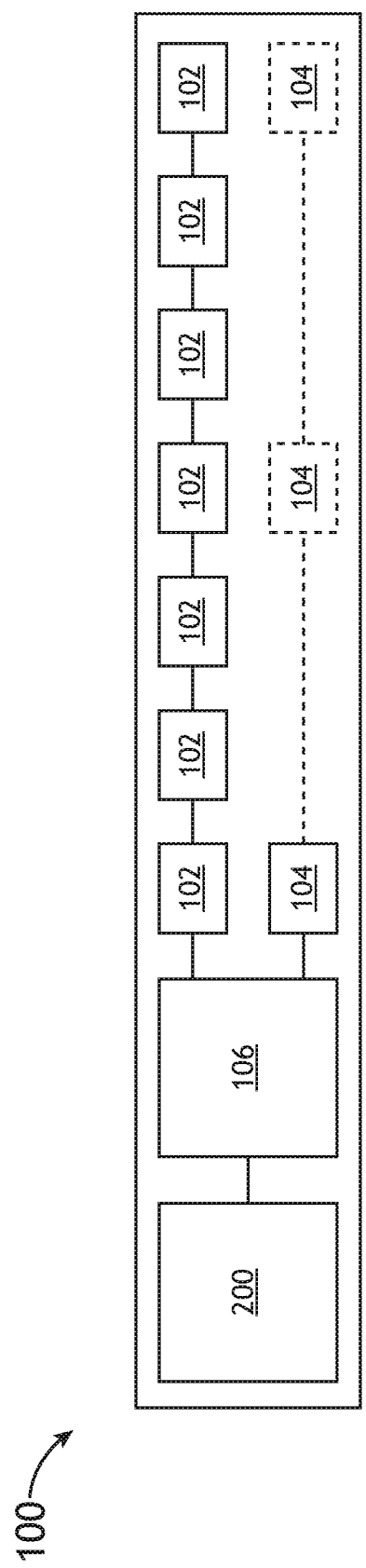
FIG. 1 is a block diagram illustrating a light fixture that includes a plurality of light sources and light source calibration and aging compensation system, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

A system for light source calibration and aging compensation is disclosed. In lighting systems that include multiple light fixtures (e.g., stacked or daisy chained light-emitting diode (LED) light strips, light tubes, light panels, or the like), the replacement of a light fixture after a period of time may result in color and/or illumination level imbalances between the replaced (new) light fixture and a neighboring (old) light fixture because the light sources (e.g., LEDs) of the new light fixture may run more efficiently (hence brighter) than the light sources of the old light fixture. The system disclosed herein helps to prevent or mitigate color and/or illumination level imbalances between neighboring light fixtures. The system disclosed herein can also provide for more consistent illumination power output by a light source/fixture over its useful lifecycle.

FIG. 1 is a block diagram illustrating a light fixture 100 that includes a system for light source calibration and aging compensation, in accordance with one or more embodiments of this disclosure. In embodiments, the light fixture 100 may be a light strip or any other type of light fixture (e.g., light bulb, light tube, light panel, etc.) that includes a plurality of light sources 102 (e.g., LEDs). For example, the light fixture 100 may include a light strip for an aircraft cabin lighting system or any other interior/exterior lighting system.

The light sources 102 may be connected in series with one another. Alternatively, one or more of the light sources 102 may be connected in parallel or in a combination of series and parallel configurations. In some embodiments, the light sources 102 include multi-color LED light sources. For example, the light sources 102 may include red-green-blue (RGB) or red-green-blue-white (RGBW) LEDs or LED chips. In other embodiments, light sources 102 include single-color LED light sources. For example, the light sources 102 may include individual red, green, blue, and/or white LEDs or LED chips. Alternatively, the light sources 102 may include a combination of multi-color and single-color LED light sources.

In embodiments, the light fixture 100 further includes or is coupled to a light source driver 106. The light source driver 106 is configured to generate one or more power signals for the plurality of light sources 102. For example, the light source driver 106 may be configured to receive an alternating current (AC) or direct current (DC) input from a power source (e.g., an aircraft power system or any other mobile/stationary power system) and generate one or more constant or pulsed DC output signals to power the light sources 102. In this regard, the light source driver 106 may include a DC power source (e.g., an AC-DC or DC-DC converter and/or adapter) and/or a pulse width modulator (PWM). In some embodiments, the light source driver 106 is a RGB or RBGW LED driver that is configured to output a separate power signal for each of the LED colors (e.g., separate red (R), green (G), blue (B), and/or white (W) signals). In this manner, the light source driver 106 can separately control the LED brightness for each LED color in order to tune individual light sources 102 (e.g., multi-color light sources) or a group of light sources 102 (e.g., single-color or multi-color light sources) to different colors and/or brightness resulting from different combinations and respective brightness of red (R), green (G), blue (B), and/or white (W) LED emissions.

For single-color or multi-color light sources 102, the illumination power output by the light sources 102 (hence the brightness of the light sources 102) can be controlled by varying current and/or duty cycle of the one or more power signals generated by the light source driver 106. For example, the light source driver 106 may be configured to generate higher current power signals to increase LED brightness overall or for one or more selected LED colors (e.g., by increasing the current of the power signals for the one or more selected LED colors). Similarly, the light source driver 106 may be configured to generate reduced current power signals to decrease LED brightness overall or at one or more selected LED colors (e.g., by reducing the current of the power signals for the one or more selected LED colors). In embodiments, where the light source driver 106 includes a PWM or any other type of pulsed power source, the light source driver 106 may be configured to increase or decrease LED brightness overall or at one or more selected LED colors by generating power signals with increased or reduced duty cycle (e.g., by adjusting pulse width and/or frequency of the power signals).

In embodiments, the light fixture 100 further includes or is coupled to one or more sensors 104 (e.g., one or more photodiodes, photoresistors, or any other photodetectors). For example, the light fixture 100 may include a sensor 104 that is configured to detect an illumination power output by at least one light source 102 of the plurality of light sources 102. The sensor 104 may be positioned adjacent to one particular light source 102 or a particular group of light sources 102. In some embodiments, the illumination power detected by the sensor 104 is used for calibration and/or aging compensation of the light fixture 100 as a whole (e.g., the measured illumination power is used to calibrate/tune all the light sources 102). In other embodiments, the light fixture 100 may include a plurality of distributed sensors 104, where each of the sensors 104 is configured to detect an illumination power that is used to calibrate/tune a respective light source 102 or a respective group of light sources 102. Alternatively, the light fixture 100 may include a plurality of distributed sensors 104, where the measurements from the sensors 104 are averaged or otherwise combined in order to calibrate/tune all the light sources 102 based on a number of illumination power measurements associated with different illumination sources 102 or groups of illumination sources 102 (e.g., at different locations/zones of the light fixture 100).

Figure 2:
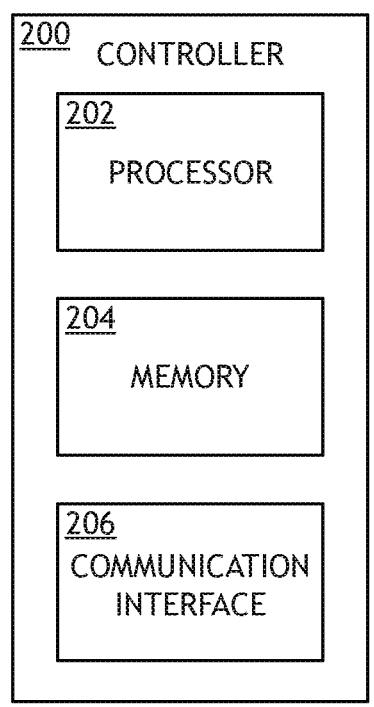
FIG. 2 is a block diagram illustrating a controller for the light fixture and/or light source calibration and aging compensation system illustrated in FIG. 1, in accordance with one or more embodiments of this disclosure.

The light fixture 100 may further include or may be coupled to a controller 200 that is programmed or otherwise configured to perform light source calibration and aging compensation functionality based on the sensor measurements. In embodiments, the controller 200 is communicatively coupled to the one or more sensors 104 and the light source driver 106. As shown in FIG. 2, the controller 200 may include at least one processor 202, at least one memory 204, and at least one communication interface 206.

The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices, system components (e.g., light sources 102, sensor 104, light source driver 106, etc.), and so forth via the communication interface 206. In embodiments, the communication interface 206 may include a transmitter, receiver, transceiver, physical connection interface, or any combination thereof.

In embodiments, the controller 200 is configured to compare the illumination power detected by the one or more sensors 104 to a target illumination power (e.g., a preprogrammed, user selected, calculated, or otherwise determined illumination power for the light fixture). For example, the controller 200 may be configured to compare the target illumination with an illumination power measured by a single sensor 104, a plurality of illumination power measurements from multiple sensors 104, or an average illumination power measurement based on a plurality of illumination power measurements from multiple sensors 104. The target illumination power may be a preprogrammed illumination power (e.g., based on initial brightness setting) or an illumination power determined via a calibration sequence. For example, the target illumination power can be a fraction (e.g., in the range of 60% to 90%, e.g., 60%, 65%, 70%, 75%, 80%, 85%, or 90%) of the maximum illumination power output of the light sources 102 (i.e., based on a new/unused light fixture). In some embodiments, the target illumination power may be a known value that is predetermined for the light fixture 100 based on light source specifications. Alternatively, the target illumination power may be a calculated value determined by running the light sources 102 at an initial (e.g., maximum or reduced, e.g., 60%, 65%, 70%, 75%, 80%, 85%, or 90%) operating current or duty cycle at installation (or a later performed calibration) and determining the target illumination power based on illumination power detected by the one or more sensors 104. For example, the controller 200 may be configured to detect or calculate the target illumination power by detecting or calculating a fraction (e.g., 60%, 65%, 70%, 75%, 80%, 85%, or 90%) of the maximum illumination power output of the light sources 102. In other embodiments, the target illumination power may be received by the controller 200 from another device (e.g., a lighting system controller, a master light fixture, a user input device, or the like).

Initially setting the target illumination power lower than the maximum illumination power output of the light sources 102 allows the controller 200 to compensate for aging of the light fixture 100 over time by causing the light source driver 106 to increase current or duty cycle of power signals generated by the light source driver 106 when the detected illumination power falls below the target illumination power. For example, the controller 200 may be configured to generate one or more control signals to adjust an electrical power output of the light source driver 106 based on the comparison of the detected illumination power to the target illumination power. In some embodiments, the controller 200 may be configured to generate the one or more control signals based on a difference between the detected illumination power and the target illumination power.

In embodiments, the one or more control signals from the controller 200 are configured to cause the light source driver 106 to adjust the one or more power signals for the plurality of light sources 102 until the illumination power detected by the one or more sensors 104 is equivalent to the target illumination power or within a predefined acceptable tolerance of the target illumination power (e.g., +/−5%, +/−10%, +/−15%, or the like). For example, the one or more control signals may cause the light source driver 106 to generate the one or more power signals with an adjusted (e.g., increased/reduced) current and/or duty cycle in order to increase/decrease the illumination power (brightness) of the light sources 102 overall and/or at particular colors (e.g., red (R), green (G), blue (B), and/or white (W)) emitted by the light sources 102.

In some embodiments, the light fixture 100 is a light strip, light tube, light panel, or other light structure that has the light sources 102, one or more sensors 104, light source driver 106, and controller 200 coupled to or at least partially embedded in the lighting structure. For example, the one or more sensors 104, light source driver 106, and/or controller 200 may be at least partially embedded in a substrate that includes a linear, two-dimensional, or three-dimensional array of light sources 102. Alternatively, one or more of the components may be coupled to the substrate (e.g., directly or via an auxiliary printed board).

Figure 3:
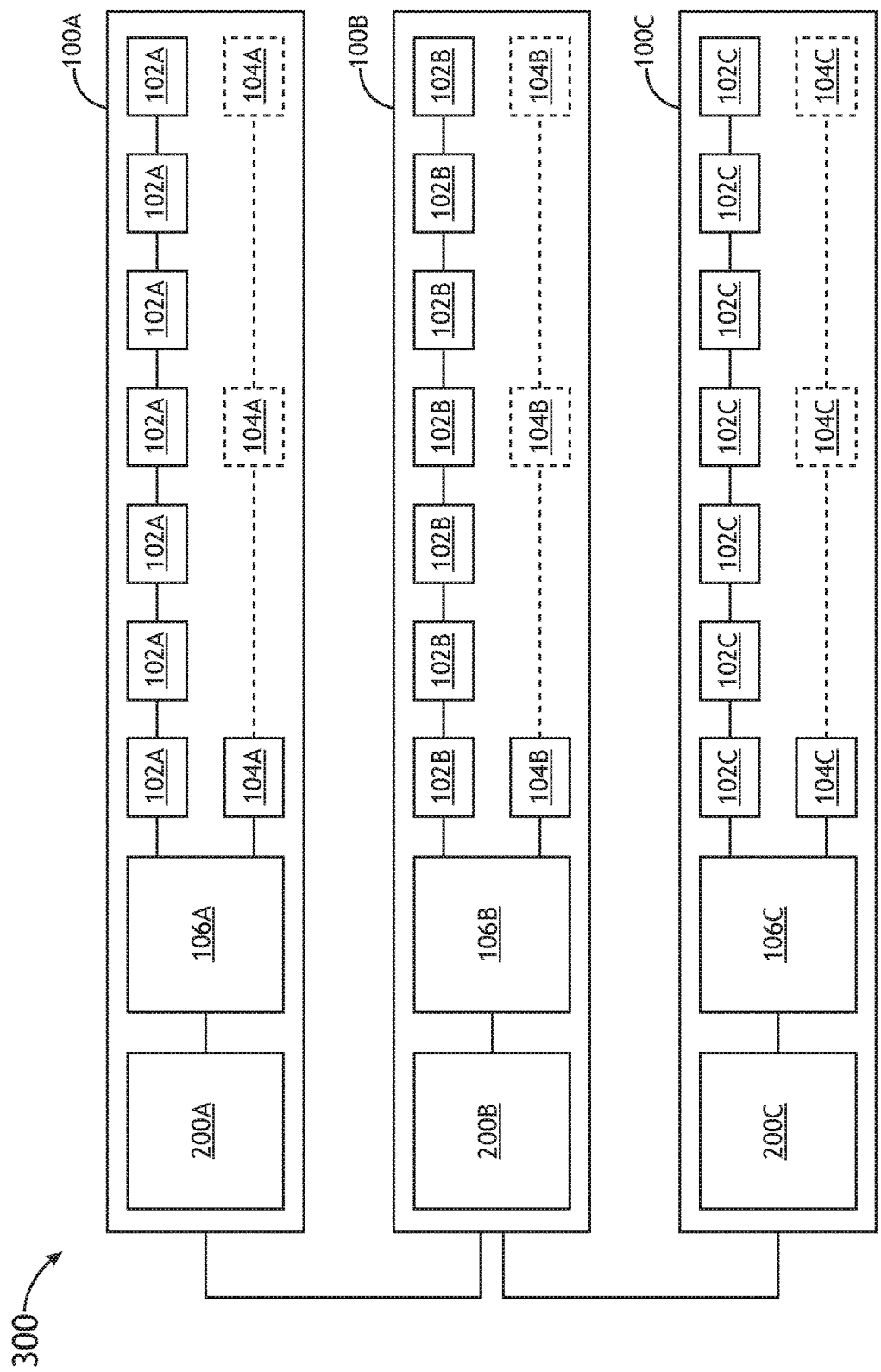
FIG. 3 is a block diagram illustrating a lighting system that includes a plurality of light fixtures, such as the light fixture illustrated in FIG. 1, in accordance with one or more embodiments of this disclosure.

Furthermore, in embodiments, the light fixture 100 (e.g., light strip, light tube, light panel, or the like) may be configured to be stacked, daisy chained, or otherwise coupled with one or more neighboring light fixtures 100 (e.g., additional light strips). For example, FIG. 3 shows an example of the lighting system 300 that includes a plurality of light fixtures 100 (e.g., light fixtures 100A, 100B, and 100C) coupled with one another.

The controllers 200A, 200B, and 200C of various light fixtures 100A, 100B, and 100C that make up a lighting system 300 may be communicatively coupled with one another. For example, the controllers 200A, 200B, and 200C may be physically coupled by one or more data cables and/or wirelessly coupled (e.g., via wireless networking or ad-hoc wireless communication).

In some embodiments, the controller 200A of a light fixture 100A may be configured to communicate illumination power detected by a respective sensor 104A to another controller (e.g., controller 200B or 200C) of another light fixture (e.g., light fixture 100B or 100C) that is coupled to the light fixture 100A. In this manner, another light fixture (e.g., light fixture 100B or 100C) can be calibrated with light fixture 100A. For example, the illumination power detected by sensor 104A of light fixture 100A can be used as the target illumination power for light fixture 100B and/or 100C.

In some embodiments, all the light fixtures 100 in the lighting system 300 are calibrated to a master light fixture (e.g., light fixture 100A). In other embodiments, all the light fixtures 100 in the lighting system 300 may be calibrated to the light fixture (e.g., light fixture 100A, 100B, or 100C) having the weakest illumination power output. In some cases, the oldest or most heavily used light fixture (e.g., light fixture 100A, 100B, or 100C) will have the weakest illumination power. In this regard, the oldest or most used light fixture (e.g., light fixture 100A, 100B, or 100C) may be automatically designated as the master light fixture. Alternatively, the lighting system 300 may be configured to run all the light fixtures 100 at the same current or duty cycle and then designate the light fixture (e.g., light fixture 100A, 100B, or 100C) having the weakest illumination power as the master light fixture and/or calibrate the light fixtures 100 to the light fixture (e.g., light fixture 100A, 100B, or 100C) having the weakest illumination power.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for light source calibration and aging compensation, comprising:
   a first plurality of light sources;
   a second plurality of light sources, the second plurality of light sources being couplable to the first plurality of light sources;
   a light source driver configured to generate one or more power signals for the second plurality of light sources;
   a sensor configured to detect an illumination power output by at least one light source of the first plurality of light sources; and
   a controller communicatively coupled to the sensor and the light source driver, the controller configured to:
      set the first plurality of light sources at a first time to within a predefined acceptable tolerance of a target illumination power, the target illumination power being lower than a maximum illumination power output of the first plurality of light sources, the first time being before the second plurality of light sources are coupled to the first plurality of light sources;
      compare the illumination power of the first plurality of light sources detected by the sensor at a second time to the target illumination power, the second time being after the second plurality of light sources are coupled to the first plurality of light sources; and
      generate one or more control signals to adjust an electrical power output of the light source driver for the second plurality of light sources based on the comparison of the illumination power of the first plurality of light sources detected by the sensor at the second time to the target illumination power when the comparison of the illumination power of the first plurality of light sources detected by the sensor to the target illumination power falls outside the predefined acceptable tolerance, the one or more control signals to adjust an electrical power output of the light source driver for the second plurality of light sources being generated after the second plurality of light sources are coupled to the first plurality of light sources.

2. The system of claim 1, wherein the controller is configured to generate the one or more control signals based on a difference between the illumination power detected by the sensor at the second time and the target illumination power.

3. The system of claim 1, wherein the light source driver comprises a direct current (DC) power source, wherein the one or more control signals cause the DC power source to adjust a current of the one or more power signals generated by the light source driver.

4. The system of claim 1, wherein the light source driver comprises a pulse width modulator (PWM), wherein the one or more control signals cause the PWM to adjust a duty cycle of the one or more power signals generated by the light source driver.

5. The system of claim 1, wherein the light source driver comprises a red-green-blue (RGB) or red-green-blue-white (RBGW) light-emitting diode (LED) driver, wherein the one or more control signals cause the RGB or RBGW LED driver to adjust at least one of a current or a duty cycle of the one or more power signals generated by the light source driver.

6. The system of claim 1, wherein the sensor and the controller are coupled to or at least partially embedded in a first light strip that includes the first plurality of light sources, wherein the light source driver is coupled to or at least partially embedded in a second light strip that includes the second plurality of light sources.

7. The system of claim 6, wherein the controller is a first controller, wherein the illumination power detected by the sensor is a first illumination power, wherein the first controller is configured to communicate the first illumination power detected by the sensor to an additional controller of an additional light strip coupled to the first light strip, wherein an additional target illumination power for the additional light strip is based on the first illumination power detected by the sensor.

8. The system of claim 6, wherein the controller is a first controller, wherein the illumination power detected by the sensor is a first illumination power, wherein the first controller is configured to receive the target illumination power from an additional controller of an additional light strip coupled to the first light strip, wherein the target illumination power is based on the additional illumination power detected by an additional sensor of the additional light strip, wherein the target illumination power is determined by an additional controller of the additional light strip prior to the first controller receiving the target illumination power.

9. The system of claim 6, wherein the controller is a first controller, wherein the target illumination power is based on a detected additional illumination power received by the first controller from an additional controller of an additional light strip coupled to the first light strip.

10. A system for light source calibration and aging compensation, comprising:
    a first plurality of light sources;
    a second plurality of light sources, the second plurality of light sources being couplable to the first plurality of light sources after a third plurality of light sources are uncoupled from the first plurality of light sources;
    a light source driver configured to generate one or more power signals for the second plurality of light sources;
    a sensor configured to detect an illumination power output by at least one light source of the first plurality of light sources; and
    a controller communicatively coupled to the sensor and the light source driver, the controller configured to:
       set the first plurality of light sources at a first time to within a predefined acceptable tolerance of a target illumination power, the target illumination power being lower than a maximum illumination power output of the first plurality of light sources, the first time being before the second plurality of light sources are coupled to the first plurality of light sources;
       compare the illumination power of the first plurality of light sources detected by the sensor at a second time to the target illumination power, the second time being after the third plurality of light sources are uncoupled from the first plurality of light sources and after the second plurality of light sources are coupled to the first plurality of light sources; and
       generate one or more control signals to adjust an electrical power output of the light source driver for the second plurality of light sources based on the comparison of the illumination power of the first plurality of light sources detected by the sensor at the second time to the target illumination power when the comparison of the illumination power of the first plurality of light sources detected by the sensor to the target illumination power falls outside the predefined acceptable tolerance, the one or more control signals to adjust an electrical power output of the light source driver for the second plurality of light sources being generated after the third plurality of light sources are uncoupled from the first plurality of light sources and after the second plurality of light sources are coupled to the first plurality of light sources.

11. The system of claim 10, wherein the controller is configured to generate the one or more control signals based on a difference between the illumination power detected by the sensor at the second time and the target illumination power.

12. The system of claim 10, wherein the light source driver comprises a direct current (DC) power source, wherein the one or more control signals cause the DC power source to adjust a current of the one or more power signals generated by the light source driver.

13. The system of claim 10, wherein the light source driver comprises a pulse width modulator (PWM), wherein the one or more control signals cause the PWM to adjust a duty cycle of the one or more power signals generated by the light source driver.

14. The system of claim 10, wherein the light source driver comprises a red-green-blue (RGB) or red-green-blue-white (RBGW) light-emitting diode (LED) driver, wherein the one or more control signals cause the RGB or RBGW LED driver to adjust at least one of a current or a duty cycle of the one or more power signals generated by the light source driver.

15. The system of claim 10, wherein the sensor and the controller are coupled to or at least partially embedded in a first light strip that includes the first plurality of light sources, wherein the light source driver is coupled to or at least partially embedded in a second light strip that includes the second plurality of light sources, wherein the second light strip is coupled to the first light strip after the uncoupling of a third light strip including the third plurality of light sources from the first light strip.

16. The system of claim 15, wherein the controller is a first controller, wherein the illumination power detected by the sensor is a first illumination power, wherein the first controller is configured to communicate the first illumination power detected by the sensor to an additional controller of an additional light strip coupled to the first light strip, wherein an additional target illumination power for the additional light strip is based on the first illumination power detected by the sensor.

17. The system of claim 15, wherein the controller is a first controller, wherein the illumination power detected by the sensor is a first illumination power, wherein the first controller is configured to receive the target illumination power from an additional controller of an additional light strip coupled to the first light strip, wherein the target illumination power is based on the additional illumination power detected by an additional sensor of the additional light strip, wherein the target illumination power is determined by an additional controller of the additional light strip prior to the first controller receiving the target illumination power.

18. The system of claim 15, wherein the controller is a first controller, wherein the target illumination power is based on a detected additional illumination power received by the first controller from an additional controller of an additional light strip coupled to the first light strip.

* * * * *